United States Patent
Iida et al.

(10) Patent No.: US 7,135,839 B2
(45) Date of Patent: Nov. 14, 2006

(54) BATTERY PACK AND METHOD OF CHARGING AND DISCHARGING THE SAME

(75) Inventors: Takuma Iida, Toyohashi (JP); Naoyoshi Shibuya, Machida (JP); Hiroki Saito, Fujisawa (JP); Hiroki Takeshima, Fujisawa (JP); Kiyoto Watanabe, Chigasaki (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 10/506,295

(22) PCT Filed: Dec. 4, 2003

(86) PCT No.: PCT/JP03/15534

§ 371 (c)(1),
(2), (4) Date: Apr. 28, 2005

(87) PCT Pub. No.: WO2004/051785

PCT Pub. Date: Jun. 17, 2004

(65) Prior Publication Data

US 2005/0225289 A1    Oct. 13, 2005

(30) Foreign Application Priority Data

Dec. 5, 2002  (JP) ............................. 2002-354091
Dec. 5, 2002  (JP) ............................. 2002-354092

(51) Int. Cl.
*H02J 7/16* (2006.01)
(52) U.S. Cl. ..................................... 320/149
(58) Field of Classification Search ................ 320/149, 320/130, 132, 133; 702/63; 429/53
See application file for complete search history.

(56) References Cited

U.S. PATENT DOCUMENTS 4,636,445 A * 1/1987 Yamano et al. ............... 429/53

(Continued)

FOREIGN PATENT DOCUMENTS

EP           1 160 953 A2    12/2001

OTHER PUBLICATIONS

"A Microcomputer-Based UPS Battery Management System", Noworolski et al., IEEE 1991, Polytronics Engineering Ltd., Mississauga, Ontario, Canada, CH2992-6/91/000-0475.*

Primary Examiner—Pia Tibbits
(74) Attorney, Agent, or Firm—Rossi, Kimms and McDowell, LLP.

(57) ABSTRACT

Disclosed are a battery package and a method for charging and discharging secondary batteries including nickel hydrogen batteries by refreshing and suppressing inactivity of the batteries. More concretely, battery package (101) comprises a group of batteries having a plurality of connected secondary batteries, each forming a unit battery, a plurality of sensors for detecting a temperature and a voltage, a display device for displaying a condition of the group of batteries, a switch for controlling charge and discharge of the group of batteries, and an operational control circuit (4) for generating a signal based on signals input from the plurality of sensors to make the display device display the condition of the group of batteries and to activate the switch, wherein the battery package (101) is provided with refreshing demand display device (13) for displaying a need to initiate a refreshing charge and discharge, and it uses the method of carrying out the refreshing charge and discharge automatically when a recovery voltage of the secondary batteries does not exceed a predetermined voltage after a lapse of a predetermined time from a moment when the secondary batteries come to a final discharge voltage. This invention can thus carry out the refreshing charge and discharge even for secondary batteries that become inactive after having been left unused for a long time.

16 Claims, 3 Drawing Sheets

U.S. PATENT DOCUMENTS

| | | | |
|---|---|---|---|
| 5,321,627 A * | 6/1994 | Reher | 702/63 |
| 5,557,188 A * | 9/1996 | Piercey | 320/134 |
| 5,600,231 A * | 2/1997 | Parker | 429/93 |
| 5,793,188 A * | 8/1998 | Cimbal et al. | 320/130 |
| 6,011,380 A * | 1/2000 | Paryani et al. | 320/132 |
| 6,456,041 B1 * | 9/2002 | Terada et al. | 320/132 |
| 6,483,272 B1 * | 11/2002 | Terada et al. | 320/103 |
| 6,583,606 B1 * | 6/2003 | Koike et al. | 320/149 |
| 6,653,819 B1 * | 11/2003 | Nagata et al. | 320/133 |
| 6,741,065 B1 * | 5/2004 | Ishii et al. | 320/122 |

FOREIGN PATENT DOCUMENTS

| | | |
|---|---|---|
| JP | 8-223812 | 8/1996 |
| JP | 11/122827 A | 4/1999 |
| JP | 2000-50521 A | 2/2000 |
| JP | 2001-95167 A | 4/2001 |
| JP | 2001-126766 A | 5/2001 |
| JP | 2001-126776 A | 5/2001 |
| JP | 2001-128313 A | 5/2001 |
| JP | 2002-223529 | 8/2002 |
| JP | 2002-238177 | 8/2002 |
| WO | WO-2004051785 * | 6/2004 |

* cited by examiner

Prior Art

BATTERY PACK AND METHOD OF CHARGING AND DISCHARGING THE SAME

THIS APPLICATION IS A U.S. NATIONAL PHASE APPLICATION OF PCT INTERNATIONAL APPLICATION PCT/JP03/15534.

TECHNICAL FIELD

The present invention relates to a battery package comprising a secondary battery such as an alkaline storage battery, and a battery controlling method such as a charging and discharging method for effective use of the battery package. In particular, the invention relates to a method of controlling a battery during charging and discharging the battery package comprising the secondary battery consisting of the alkaline storage battery such as a nickel hydrogen battery used in the battery package, as well as a method of making effective use of a capacity of the secondary battery contained in the battery package.

BACKGROUND ART

The remarkable progress in the technology of electronics in recent years has made possible downsizing and weight reduction of many electronic apparatuses, and it has resulted in a rapid advancement of cordless and portable operation of the apparatuses. With the advancement of these apparatuses, there is an increased demand for small and lightweight batteries (i.e., storage batteries, or secondary batteries) of high energy density, useful as power supplies for the electronic apparatuses. These batteries have been used as power supplies of numerous products including power sources of electric tools, backup power supplies, and the like. Nickel cadmium battery is one kind of these batteries (i.e., secondary batteries) that have been hitherto used widely as the power supplies. However, because of the increase in demand of high capacity, and worldwide concern of environmental problems, nickel hydrogen batteries have been developed recently as new products to replace the nickel cadmium batteries, and they are now spreading widely into the market.

In a battery package comprising any of these secondary batteries, however, there was a tendency in the past that a battery voltage decreases due to self-discharge and the like of the battery if it is left unused for a long period of time, in addition to a problem that a capacity of the battery decreases because the battery becomes inactive during repeated recharges and discharges, which eventually makes the battery unable to maintain a sufficient capacity. A cause of the inactivity of the battery is that the repeated recharges and discharges cause reduction of oxide in a positive electrode, and oxidization of hydroxide in a negative electrode. To clear the inactivity resulted from the above causes, the battery needs refreshing charge and discharge.

A number of methods were contrived to carry out the refreshing charge and discharge. To cite a few examples, one method is to give a display, which indicates a need to carry out a refreshing discharge by counting a number of recharges or discharges, and another method proposed is to increase the number to be counted according to a temperature of the battery and decreases a number of recharges before initiating the refreshing process since the battery tends to enhance the memory effect when the battery temperature is high (refer to an Unexamined Japanese Patent Application, Publication No. 2001-126776).

Figure 3:
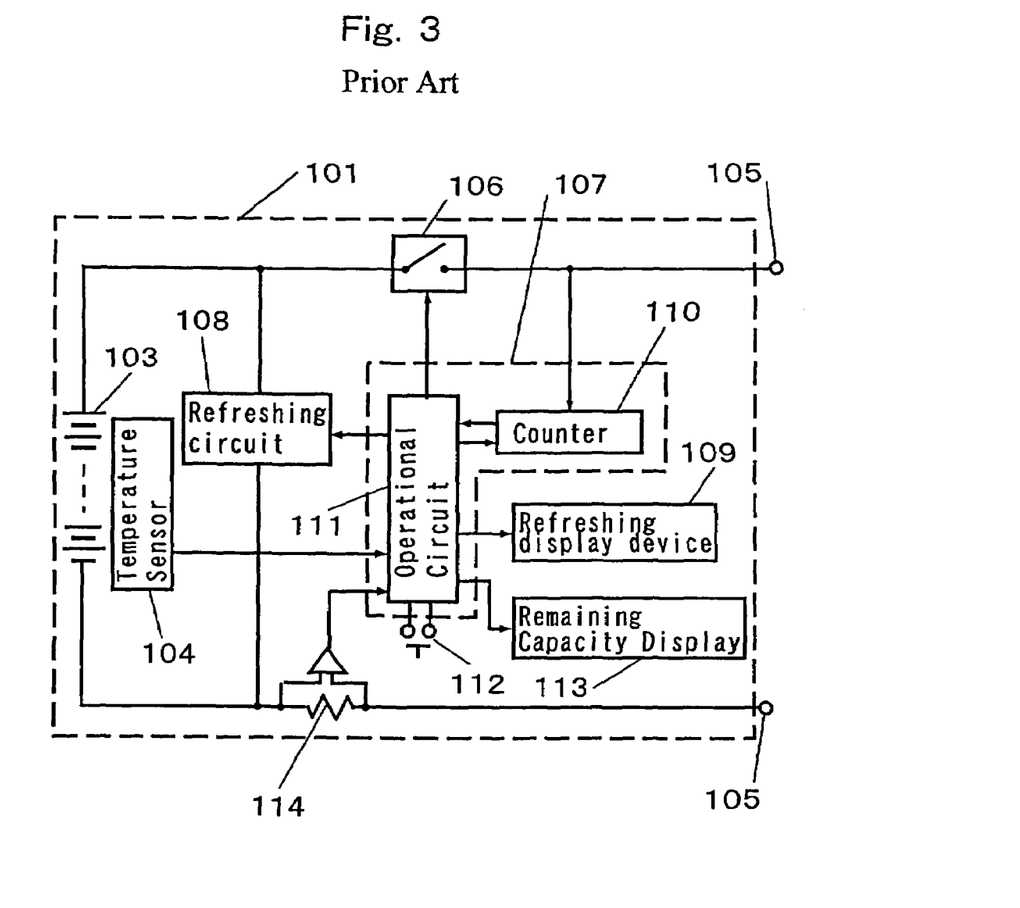
FIG. 3 is a block diagram of a battery package for reference purpose in connection with description of a conventional method of displaying a capacity used for refreshing charge and discharge of a secondary battery.

FIG. 3 is a block diagram of a battery package, prepared for the purpose of describing an example of such conventional methods of displaying a capacity of secondary battery used for the refreshing charge and discharge. In FIG. 3, packaged battery 101 (or, a battery package) used for the method of displaying a capacity comprises: secondary battery 103 of a type a dischargeable capacity of which decreases due to the memory effect as recharge and discharge are repeated; remaining capacity display device 113 for displaying a remaining capacity of the battery package by lighting up a corresponding number of indicator lamps among a plurality of them, or by using a liquid crystal display and the like; current detection circuit 114 for detecting a charging current and a discharge current of the battery; temperature sensor 104 placed in contact with secondary battery 103 for detecting a temperature of secondary battery 103; switch 106 composed of a semiconductor switching element such as an FET or a transistor, and connected between secondary battery 103 and output terminal 105; control circuit 107 for computing the remaining capacity and a timing of refreshing, in addition to controlling the switch 106; refreshing circuit 108 for discharging secondary battery 103 nearly completely to cancel the memory effect of the secondary battery 103; and refreshing display device 109 for displaying the refreshing operation.

Temperature sensor 104 in packaged battery 101 detects a temperature of secondary battery 103, and inputs a temperature signal to control circuit 107. Switch 106 is controlled by control circuit 107 in a manner that it turns on when secondary battery 103 needs charging, and it turns off when secondary battery 103 is fully charged to prevent overcharging of the secondary battery 103. In addition, switch 106 is controlled also by control circuit 107 in a manner to turn on when secondary battery 103 is discharged, but it is turned off again when secondary battery 103 is completely discharged to prevent the secondary battery 103 from being over-discharged.

Control circuit 107 is provided with counter 110 for counting a number of recharges of secondary battery 103, as well as operational circuit 111. Operational circuit 111 computes a timing to initiate a refreshing operation by comparing a counted value of counter 110 with a preset value, controls switch 106 by detecting a charging condition and discharging condition of secondary battery 103, and computing a remaining capacity from a charging current and a discharging current. Counter 110 counts the number of recharges by adding one to the counted value whenever recharging is made, and resets the counted value to zero when the secondary battery 103 is refreshed. Counter 110 also checks the charging condition by detecting a change in voltage across output terminals 105, when a charger (not show in the figure) is connected for charging secondary battery 103. Current detection circuit 114 is connected between secondary battery 103 and one of output terminals 105, and a voltage produced at both ends of this current detection circuit 114 is used to detect a charging current as well as a discharging current. Operational circuit 111 compares the number of recharges of packaged battery 101, or the counted value of counter 110, with the preset value, and informs of a timing of the refreshing operation when the counted value becomes equal to or exceeds the preset value. However, operational circuit 111 is controlled according to a program so that it determines the timing of refreshing operation after correcting the counted value of counter 110 based on the battery temperature, instead of comparing the counted value directly with the preset value, since the secondary battery 103 generally has a tendency of enhancing the memory effect when its temperature rises, and losing the memory effect when the temperature falls.

During the refreshing discharge in which the secondary battery is discharged from the fully charged condition to a final discharge voltage, the conventional method of this kind for displaying a capacity of the secondary battery comprises the steps of computing a full-charge capacity according to an integrated value of discharge current, correcting a remaining capacity by using the computed full-charge capacity, and further correcting the remaining capacity thereafter by using the counted value. Additionally, this method comprises the steps of counting a number of recharges of the secondary battery, and displaying a need of refreshing operation when the counted number of recharges reaches a predetermined number. The method further comprises the steps of detecting a battery temperature, and reducing the number of recharges to be counted before initiating a refreshing operation of the secondary battery.

In this method of counting a number of recharges, however, there was a drawback in which a need for the refreshing charge and discharge is not displayed when the battery become inactive as a result of it having been left unused for a long period of time, since the refreshing charge and discharged is programmed to be carried out according to the number of recharges or discharges, irrespective of the actual charge and discharge condition of the battery. To put it more concretely, consider an example of charge and discharge system which is designed to carried out a refreshing charge and discharge every after 50 times of recharging and discharging. After the battery has undergone 25 times of recharging and discharging process, for instance, it is still due to normal recharge and discharge without being subjected to another refreshing charge and discharge even if it is left unused for a long time without being recharged or discharged and becomes inactive, because the number of recharge counts has not reached 50 times. This is a problem to be resolved, since a resulting increase in an internal resistance of the battery due to enhancement of the memory effect and inactive condition of the battery makes it not capable of discharging a sufficiently large current, and prevents it from being used effectively.

The present invention was contrived to solve the above problems in the conventional method of carrying out the refreshing charge and discharge of the secondary battery contained in the battery package. It is thus an object of this invention to provide a technique which makes refreshing charge and discharge possible even for the secondary battery that has been left unused for a long time and become inactive, and to make the secondary battery effectively useful.

SUMMARY OF THE INVENTION

To achieve the above object, a battery package of this invention comprises: a group of batteries having a plurality of connected secondary batteries, each forming a unit battery; a plurality of sensors for detecting a temperature and a voltage; a display device for displaying a condition of the group of batteries; a switch for controlling charge and discharge of the group of batteries; and an operational control circuit for generating a signal based on signals input from the plurality of sensors to make the display device display the condition of the group of batteries, and to activate the switch, wherein this structure is provided further with a refreshing demand display device for displaying a need to initiate a refreshing charge and discharge if a recovery voltage of the secondary batteries does not exceed a predetermined voltage after a predetermined time has elapsed from a moment when the batteries come to a final discharge voltage.

Another battery package of this invention comprises: a group of batteries having a plurality of connected secondary batteries, each forming a unit battery; a plurality of sensors for detecting a temperature and a voltage; a display device for displaying a condition of the group of batteries; a switch for controlling charge and discharge of the group of batteries; and an operational control circuit for generating a signal based on signals input from the plurality of sensors to make the display device display the condition of the group of batteries, and to activate the switch, wherein the operational control circuit has a non-detecting timer for preventing the sensors from detecting the voltage during another predetermined time period from beginning of the charge, the operational control circuit counts a number of times in which the voltage of the batteries exceeds a preset voltage within the another predetermined time period, and the battery package is provided further with a refreshing demand display device for displaying a need to initiate a refreshing charge and discharge when the counted number reaches a predetermined number.

Still another battery package of this invention comprises: a group of batteries having a plurality of connected secondary batteries, each forming a unit battery; a plurality of sensors for detecting a temperature and a voltage; a display device for displaying a condition of the group of batteries; a switch for controlling charge and discharge of the group of batteries; and an operational control circuit for generating a signal based on signals input from the plurality of sensors to make the display device display the condition of the group of batteries, and to activate the switch, wherein the operational control circuit has a non-detecting timer for preventing the sensors from detecting the voltage during another predetermined time period from beginning of the charge, the operational control circuit counts a number of times in which the voltage of the batteries exceeds a preset voltage within the another predetermined time period, and the battery package is provided further with a refreshing demand display device for displaying a need to initiate a refreshing charge and discharge in any of events that the counted number reaches a predetermined number, and a recovery voltage of the batteries does not exceed a predetermined voltage after a predetermined time has elapsed from a moment when the batteries come to a final discharge voltage.

Furthermore, the battery package of this invention comprises any of a structure having a refreshing demand display device for displaying a need to initiate a refreshing charge and discharge if the recovery voltage of the secondary batteries does not exceed 1.15 volt after one day or longer time has elapsed from a moment when the batteries come to the final discharge voltage; another structure having secondary batteries, each comprising an alkaline storage battery provided with a positive electrode mainly composed of a nickel oxide, a negative electrode, a separator, and an alkaline electrolyte; still another structure having the batteries provided with a negative electrode formed of a hydrogen storage alloy; and yet another structure having a temperature sensor for detecting a temperature of the secondary batteries and an operational control circuit for computing a rate of temperature change according to the detected temperature, and generating a signal for termination of the charge and delivering it to a switch for controlling charge and discharge of the group of batteries when the rate of temperature change exceeds a preset range.

To further achieve the above object, a method of charging and discharging battery of this invention pertains to a battery package comprising: a group of batteries having a plurality of connected secondary batteries, each forming a unit battery; a plurality of sensors for detecting a temperature and a voltage; a display device for displaying a condition of the group of batteries; a switch for controlling charge and discharge of the group of batteries; and an operational control circuit for generating a signal based on signals input from the plurality of sensors to make the display device display the condition of the group of batteries, and to activate the switch, wherein the method comprises the step of carrying out a refreshing charge and discharge if a recovery voltage of the secondary batteries does not exceed a predetermined voltage after a predetermined time has elapsed from a moment when the batteries come to a final discharge voltage.

Another method of charging and discharging battery of this invention pertains to a battery package comprising: a group of batteries having a plurality of connected secondary batteries, each forming a unit battery; a plurality of sensors for detecting a temperature and a voltage; a display device for displaying a condition of the group of batteries; a switch for controlling charge and discharge of the group of batteries; and an operational control circuit for generating a signal based on signals input from the plurality of sensors to make the display device display the condition of the group of batteries, and to activate the switch, wherein the method comprises the steps of preventing the sensors from detecting the voltage by means of a non-detecting timer provided in the operational control circuit; counting a number of times in which the voltage of the batteries exceeds a preset voltage within another predetermined time period by means of the operational control circuit; and carrying out a refreshing charge and discharge when the counted number reaches a predetermined number.

Still another method of charging and discharging battery of this invention pertains to a battery package comprising: a group of batteries having a plurality of connected secondary batteries, each forming a unit battery; a plurality of sensors for detecting a temperature and a voltage; a display device for displaying a condition of the group of batteries; a switch for controlling charge and discharge of the group of batteries; and an operational control circuit for generating a signal based on signals input from the plurality of sensors to make the display device display the condition of the group of batteries, and to activate the switch, wherein the method comprises the steps of preventing the sensors from detecting the voltage by means of a non-detecting timer provided in the operational control circuit; counting a number of times in which the voltage of the batteries exceeds a preset voltage within another predetermined time period by means of the operational control circuit; and carrying out a refreshing charge and discharge in any of events that the counted number reaches a predetermined number, and a recovery voltage of the batteries does not exceed a predetermined voltage after a predetermined time has elapsed from a moment when the batteries come to a final discharge voltage.

In addition, the method of charging and discharging battery of this invention comprises the step of carrying out a refreshing charge and discharge if the recovery voltage of the secondary batteries does not exceed 1.15 volt after one day or longer time has elapsed from a moment when the batteries come to the final discharge voltage.

Furthermore, the method of charging and discharging battery of this invention comprises any of the steps of charging the battery up to 90 to 120% of an initial capacity with a current of 5.0 It or less, and further charging up to 150 to 200% with a current of 2.0 It or less for a given duration controlled by the timer function provided in the operational control circuit during the refreshing charge and discharge, where "It" denotes a rated battery capacity; detecting a temperature of the secondary batteries with the sensor, computing a rate of temperature change according to the detected temperature by means of the operational control circuit, and delivering a signal for termination of the charge. to the switch for controlling-charge and discharge of the group of batteries when the rate of temperature change exceeds a preset range; presetting the rate of temperature change to 0.5 to 4.0° C./min; presetting the rate of temperature change to 1.0 to 3.0° C./min; and carrying out the charge and discharge by any of a constant-current charging and discharging method, a constant-voltage charging and discharging method, and a combination of the constant-current charging and discharging method and the constant-voltage charging and discharging method.

In the above structure, the battery voltage decreases or the internal resistance increases if the unit batteries constituting the secondary batteries included in the battery package are inactive and their voltage is 1.15 volt or less. This is a phenomenon caused by decrease in reactivity of the electrodes and loss of uniformity in distribution of the electrolytic solution inside the batteries, which produces oxygen and hydrogen gases due to decomposition of water as an adverse reaction besides the original charge and discharge reactions, and these gases accelerate degradation of the batteries and shortens their serviceable life. The refreshing charge and discharge, when carried out in a timely manner, can reactivate the electrodes and suppress generation of the oxygen and hydrogen gases, thereby prolonging the serviceable life of the batteries.

When the batteries are charged and discharged with a large current in such instances that a charging voltage is increased abruptly during the initial stage of charging and the batteries are discharged rapidly, the large current promotes the adverse reaction and increases an amount of gases generated inside the batteries, which accelerates degradation of the batteries and further shortens the life span of these secondary batteries. For the above reason, this invention suppresses the generation of gases by charging the batteries up to 90 to 120% of the initial capacity at first with a current of 5.0·It or less, then up to 150 to 200% with a current of 2.0·It or less, and discharging them thereafter. This method can thus activate the electrodes, and prolong the serviceable life of the secondary batteries.

In addition, since the invented method comprises the step of resetting the remaining capacity every after the refreshing charge and discharge of the secondary batteries, this method can rectify a reduction of the capacity attributable to the decrease in charging efficiency of the battery package due to inactivity of the electrodes, thereby realizing efficient charging and discharging.

BEST MODE FOR CARRYING OUT THE INVENTION

Referring to the accompanying drawings, description will be provided hereinafter of a battery package equipped with a secondary battery and a method of carrying out refreshing charge and discharge according to a preferred embodiment of the present invention.

Figure 1:
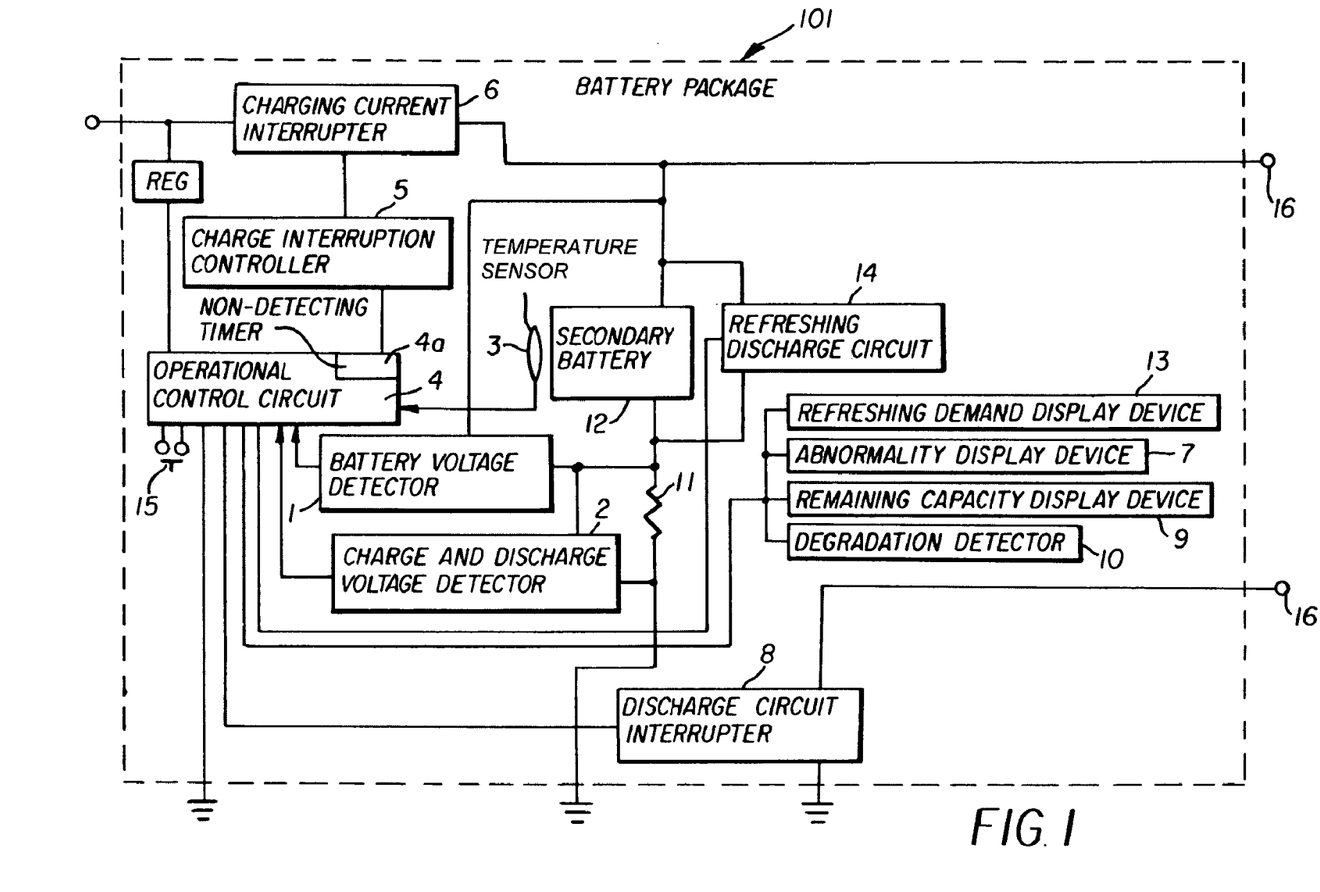
FIG. 1 is a block diagram of a battery package for reference purpose in connection with description of a method of displaying a capacity used for refreshing charge and discharge of a secondary battery according to the present invention.

Shown in FIG. 1 is a block diagram of a battery package for use in connection with the following discussion of a method of displaying a capacity used for the refreshing charge and discharge of the secondary battery according to the present invention. In FIG. 1, packaged battery 101 (may also be called "battery package") contains battery voltage detector 1 for monitoring a voltage of secondary battery 12 constituting the packaged battery 101, charge and discharge current detector 2 for detecting an electric current across shunt resistor 11 connected to secondary battery 12 and determining whether the battery is being charged or discharged, and a number of sensors such as temperature sensor 3 made of a thermistor or the like for detecting a temperature. Operational control circuit 4 comprising a semiconductor device such as a microcomputer IC or the like receives detected signals from the group of sensors, and delivers a signal to charge interruption controller 5 comprising a switching device such as an FET to regulate a charging current by means of charging current interrupter 6 also composed of a switching device such as an FET. Operational control circuit 4 sends another signal to abnormality display device 7 comprising an LED or the like device for indication of an abnormality when it determines presence of the abnormality in temperature, etc based on data on a battery temperature, a rate of change of the temperature, and the like delivered from temperature sensor 3.

Furthermore, operational control circuit 4 compares the battery voltage read by battery voltage detector 1 with a predetermined value of voltage, and outputs a signal to refreshing demand display device 13 comprising an LED, for instance, when the voltage is smaller than the predetermined value, to display the need to initiate a refreshing charge and discharge. According to this display, a user turns on refreshing switch 15 to send a signal from operational control circuit 4 to charge interruption controller 5, which in turn performs switching control of charging current interrupter 6 to carry out the refreshing charge. Packaged battery 101 also comprises refreshing discharge circuit 14 for carrying out the refreshing discharge, and discharge circuit interrupter 8 comprising a switching device for interrupting the discharge in response to a signal from operational control circuit 4.

If the secondary battery is inactive, it shows a phenomenon in which the voltage rises rapidly immediately after the start of a charging process, but this rapid rise soon subsides and the voltage again increases gradually as the charging process advances. In packaged battery 101 used for the refreshing charge and discharge of the secondary battery according to this exemplary embodiment of the invention, operational control circuit 4 is provided with a non-detecting timer (not shown) for avoiding the circuit 4 from detecting the rapid rise of voltage of the secondary battery during a predetermined time period (non-detecting time) in the beginning of the charging process in order to prevent operational control circuit 4 from interrupting the charging process due to its voltage control function, when battery voltage detector 1 detects the voltage and a rate of the voltage change resulting from the rapid rise of the voltage.

During this non-detecting time period, operational control circuit 4 compares the battery voltages taken by battery voltage detector 1 with a predetermined voltage value, counts the number of times the battery voltage detector 1 read a lower battery voltage if the voltage value is smaller than the predetermined value, and outputs a signal to refreshing demand display device 13 comprising an LED or the like, when the number reaches a preset value, to display the need to initiate a refreshing charge and discharge. In response to the indication of refreshing demand display device 13, a refreshing discharge is also performed in this case by means of refreshing discharge circuit 14 and discharge circuit interrupter 8.

Operational control circuit 4 also sends other signals to any of remaining capacity display device 9 and degradation detector 10 comprising LED's, when necessary, to make a variety of displays. Here, any of the switching devices that constitute charge interruption controller 5, charging current interrupter 6 and discharge circuit interrupter 8 may be substituted by a semiconductor device such as an FET or a relay.

The method of this invention for refreshing charge and discharge of the battery package composed of the secondary battery such as an alkaline storage battery is intended to manage the secondary battery after it becomes inactive by using a charge and discharge control circuit having the refreshing function. Description is now provided more concretely of this controlling method.

Figures 2A, 2B:
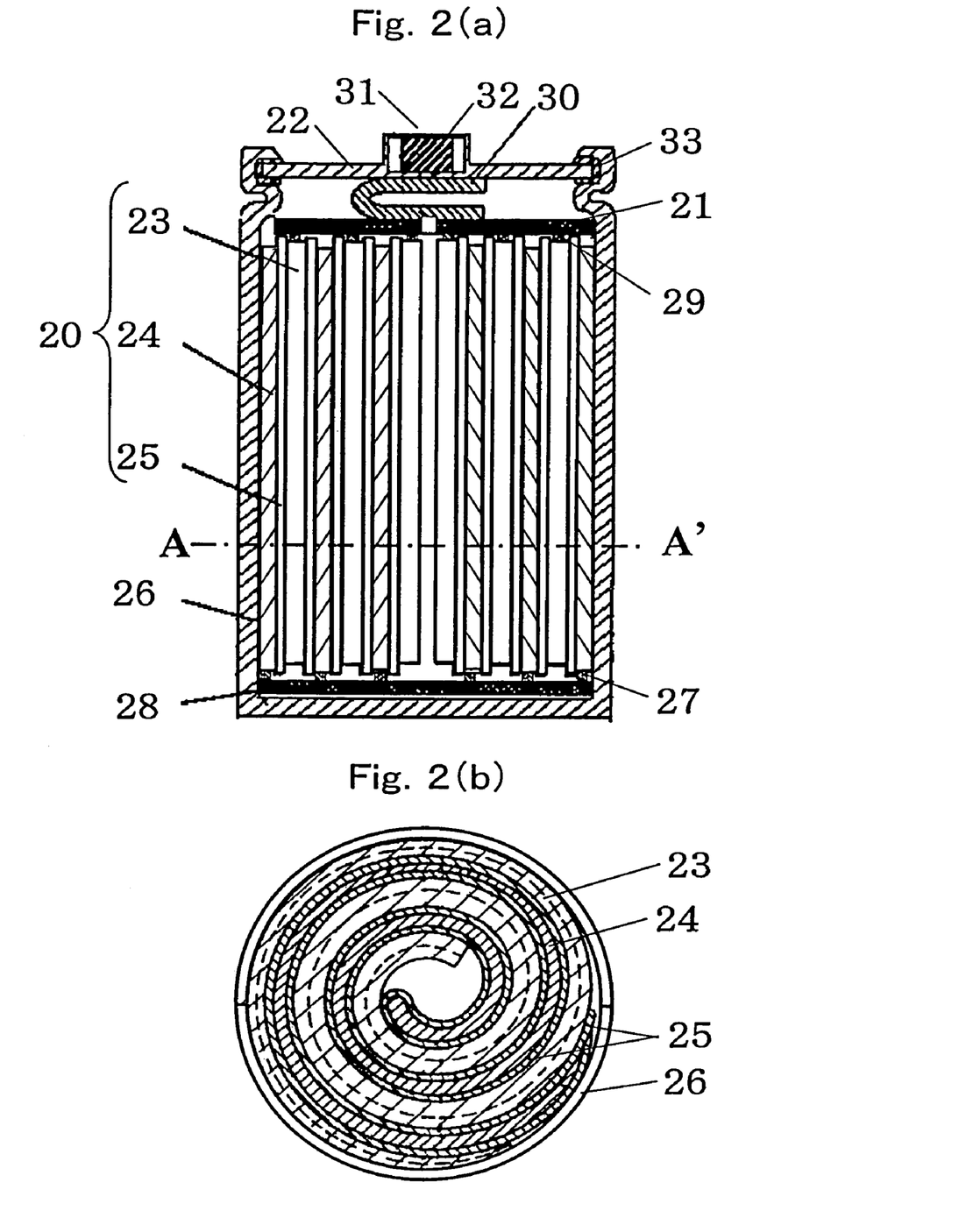
FIG. 2(a) is a longitudinal sectional view of an alkaline storage battery contained in the battery package of this invention, as sectioned vertically in a plane along the center of a positive electrode terminal of the battery.
FIG. 2(b) is a cross sectional view of the alkaline storage battery contained in the battery package of this invention, as sectioned along a line A–A' shown in FIG. 2(a)

Battery package 101 comprises ten pieces of serially connected unit batteries, each rated 3.5 Ah in capacity and 1.2V in voltage for a combined rating of 3.5 Ah and 12V used here as an example of the secondary battery 12 composed of alkaline storage batteries. The alkaline storage batteries used as the unit batteries for the secondary battery 12 contained in this battery package 101 has a structure shown in FIG. 2. FIG. 2(a) is a longitudinal sectional view of the alkaline storage battery contained in the battery package of this invention, as sectioned vertically in a plane along the center of a positive electrode terminal thereof, and FIG. 2(b) is a cross sectional view of the sane battery as sectioned along a line A–A' shown in FIG. 2(a).

In FIG. 2, electrode assembly 20 is prepared by sandwiching positive electrode plate 23 in a form of sheet strip composed mainly of a nickel oxide and negative electrode plate 24 also of a sheet strip form with separators 25 of the same sheet strip form, each placed between the electrode plates 23 and 24 in a manner to isolate them electrically, winding the assembly around a spool of a prescribed diameter into a spiral configuration, wrapping around them with an insulation tape to fix the wound configuration, and resistance-welding a metal collector of substantially a circular shape to projecting portions 27, 29 of the positive and the negative electrode plates by using a bronze welding rod. After the electrode assembly 20 bearing the metal collectors attached thereto by welding is inserted in metal case 26, metal collector 28 at the bottom side welded to projecting portions 27 under the negative electrode plate 24 is further welded electrically to a bottom surface of metal case 26 by a bronze welding rod inserted through a void space in the center of electrode assembly 20 from where the spool has been removed, and a given amount of alkaline electrolyte is injected from an opening on top of metal case 26. After that, metal seal plate 22 provided with a positive terminal 31 of a cap-like shape is inserted in the top opening of metal case 26, lead wire 30 defining a collector tab is connected to a lower surface of metal seal plate 22, and finally the top opening of metal case 26 and metal seal plate 22 are sealed together with gasket 33 placed around a fringe between them to thus complete an alkaline storage battery of the structure shown in FIG. 2 of this exemplary embodiment of the invention. The secondary battery contained as a unit battery in the battery package of this invention needs not be limited to the alkaline storage battery of the structure shown in FIG. 2, but it can be a nickel hydrogen battery which uses negative electrode plate 24 composed of a base material coated with powder of hydrogen storage alloy.

Referring again to FIG. 1, battery voltage detector 1 monitors a total voltage, or the sum of all secondary batteries contained in battery package 101 at all the time. When the secondary batteries contained in battery package 101 ceases to discharge, the battery voltage starts rising gradually thereafter from the final discharge voltage to the recovery voltage. It takes about 2 to 3 hours for the full recovery in the faster cases, but a day or longer in other cases depending on conditions of the secondary batteries.

If the unit batteries composing secondary battery 12 contained in battery package 101 become inactive and show a recovery voltage equal to or less than 1.15V after the lapse of a certain time from the end of discharge, the battery voltage decreases and an internal resistance increases. This is attributable to a fall in reactivity of the electrodes, which causes uneven distribution of the electrolytic solution inside the batteries, and produces oxygen and hydrogen gases due to decomposition of water as an adverse reaction besides the original charge and discharge reactions. These gases accelerate degradation of the batteries and shorten their serviceable life. The refreshing charge and discharge, when carried out, can reactivate the electrodes and suppress generation of the oxygen and hydrogen gases, thereby prolonging the serviceable life of the batteries.

More specifically, when the battery voltage (i.e., recovery voltage) of these unit batteries becomes 1.15V/cell or less after the lapse of one or more days from the end of discharge, battery voltage detector 1 sends a signal to operational control circuit 4 comprising the microcomputer or the like, and operational control circuit 4 in turn sends another signal to refreshing demand display device 13 to make it display. When a user pushes refreshing switch 15 upon finding the display indicating a need for refreshing charge due to the decrease in battery capacity, operation control circuit 4 connected to the refreshing switch 15 delivers a signal for initiation of the refreshing charge to charge interruption controller 5 comprising a switching device such as an FET. As a result, charge interruption controller 5 turns on a switch in charging current interrupter 6, also comprising a switching device such as an FET, to start the charging process.

On the other hand, when the batteries are charged and discharged with a large current in such instances that the charging voltage is increased abruptly during the initial stage of the charging process and that the batteries are discharged rapidly, the large current promotes the adverse reaction and increases an amount of gases generated inside the batteries, which accelerates degradation of the batteries and further shortens the life span of these secondary batteries. In other words, the amount of gases increases rapidly when the batteries are overcharged, and this increase in the amount of gases also influences a magnitude of the charging current. It is a general practice that the batteries are charged with a large current up to 120% of their capacity, and the charge is continued with a reduced current thereafter (beyond 120%). In general, batteries can be charged with a large current only up to 120%, although this depends upon design of the batteries. It is difficult to reactivate the electrode plates sufficiently if the batteries are not overcharged properly. Since the negative electrodes, in particular, have a capacity 1.5 times that of the positive electrodes, these electrode plates can not be reactivated unless the batteries are charged to at least 1.5 times (150%) the charging capacity of the positive electrodes. On the other hand, overcharging in excess of two times (200%) the capacity must be avoided since it deteriorates the batteries considerably.

It is thus desirable to discharge the batteries after they are charged up to 90 to 120% of the initial capacity at first with a current of 5.0·It or less, then up to 150 to 200% with a current of 2.0·It or less. This method can thus activate the electrode plates while suppressing generation of the gases, and thereby it prolongs the serviceable life of the batteries. Here, symbol "It" denotes a value of rated capacity of the batteries, and charging and discharging current is generally represented by a multiple of this value. If a battery has 1 Ah capacity, for instance, 1.0·It represents 1 ampere and 2.0·It represents 2 amperes.

Battery package 101 of this invention is adaptable for receiving power from any kind of charging power supply using any such method as constant-current charging, constant-voltage charging, or a combination of the constant-current charging and the constant-voltage charging, although FIG. 1 does not show the charging power supply to be connected to terminals 16 of battery package 101.

Sensor 3 comprising a thermistor, for example, for monitoring temperature is placed in the vicinity of the batteries to constantly check a temperature of the batteries. Normally, an NTC (i.e., negative temperature coefficient) type thermistor is used as a suitable device for this temperature-monitoring sensor 3. In this invention, a signal is sent to operational control circuit 4 comprising the microcomputer IC or the like device when a rate of change in temperature of the batteries exceeds a predetermined value, and operational control circuit 4 in turn gives a command for termination of the charging operation to charge interruption controller 5 comprising the switching device such as an FET. This turns off the switch in charging current interrupter 6 also comprising the switching device such as an FET, and the charge is thus terminated. It is desirable that the rate of temperature change "ΔT" of the batteries is kept between 0.5 and 4.0° C./min, since it requires a considerably long time for charging and discharging process if it is smaller than 0.5° C./min, and it accelerates degradation of the batteries substantially if larger than 4.0° C./min. In consideration of working hours required for charging and discharging properly as well as the serviceable life of the batteries, it is more desirable that the rate of temperature change "ΔT" of the batteries is set between 1.0 and 3.0° C./min before interrupting the charge. If the rate of temperature change "ΔT" of the batteries is larger than the above value, it means the batteries are charged or discharged with a current equal to or exceeding 5.0·It. Since this leads to an overcharge in excess of 120% of the initial capacity, it can result in a large amount of gases generated inside the batteries, as described previously in relation of the overcharge to generation of the gasses. This gives rise to a possibility of degrading the secondary batteries and deteriorating the property affecting their serviceable life. For this reason, the batteries are charged subsequently up to 150 to 200% of the initial capacity by changing the charging current to 2.0·It for a given duration of time controlled by the timer function (may be called timer charging) provided in operational control circuit 4 comprising the microcomputer or the like. The timer charging makes possible to overcharge the batteries that have become inactive, and to reactivate them. In battery package 101 shown in FIG. 1, operational control circuit 4 actually counts the charging time. When the charging time is set to 30 minutes, for instance, operational control circuit 4 comprising the microcomputer or the like sends a signal again to charge interruption controller 5 comprising the switching device such as an FET after the lapse of 30 minutes, and charging current interrupter 6 comprising the switching device such as an FET also turns off its switch to terminate the charging process.

The invention also realizes reduction of working man-hours in the manufacturing process by way of operating refreshing discharge circuit 14 with operational control circuit 4 comprising the microcomputer or the like, which has the refreshing function for automatically initiating the refreshing charge and discharge.

There are two methods of determining a remaining capacity, of which one is a method of measuring a closed-circuit voltage during discharge, and the other is a current integration method wherein time and current are added up during charges and discharges. The current integration method is desirable for adoption to this method of charging and discharging the secondary battery of the invention, since the former method of measuring the closed-circuit voltage is liable to rise a phenomenon similar to the memory effect, which impedes continuous monitoring of the correct capacity of the battery.

In the case of charging an inactive battery, an internal resistance of the battery increases and temperature of the battery rises. This terminates the charging process before the battery is fully charged because it decreases a charging efficiency, and reduces an apparent capacity (i.e., remaining capacity), which causes premature functioning of the charging control. As described, there is an increase in difference between the actual capacity and the apparent capacity (i.e., remaining capacity). In this case, it is necessary to reset the remaining capacity after refreshing the battery, and to display the capacity again in order to correct the reduction in the capacity caused by the decrease in charging efficiency of the battery package attributable to inactivity of the electrode plates, and this requires a special attention. In other words, the battery needs to be reactivated (i.e., refreshing charge and discharge, or resetting) to normalize operation of the charging control, and to make it terminate the charging process when the battery is fully charged. Accordingly, the method of charging and discharging the secondary battery of this invention can easily control the refreshing process by using a variety of display devices equipped in packaged battery 101. A remaining capacity meter capable of indicating the remaining capacity in five levels with LED's may be an example of the display device suitable for use as remaining capacity display device 9 shown in FIG. 1.

INDUSTRIAL APPLICABILITY

According to the present invention, the method of carrying out refreshing charge and discharge of the secondary battery uses an operational control circuit comprising a microcomputer or the like and the refreshing function by means of various kinds of display devices such as a refreshing demand display device and switching devices to execute the refreshing charge and discharge, thereby clearing inactivity of a variety of secondary batteries including alkaline storage batteries such as nickel hydrogen batteries, and making effective use of the batteries. In addition, since this method of carrying out the refreshing charge and discharge of the secondary battery of the invention is adaptable for receiving power from any kind of charging power supply that uses any method such as constant-current charging, constant-voltage charging, and a combination of the constant-current charging and the constant-voltage charging, it can be adapted to many kinds of apparatuses equipped with secondary batteries such as alkaline storage batteries.

The invention claimed is:

1. A battery package comprising:
   a group of batteries having a plurality of connected batteries forming a secondary battery;
   a plurality of sensors for detecting a temperature and a voltage;
   a display device for displaying a condition of the secondary battery;
   a switch for controlling charge and discharge of the secondary battery;
   an operational control circuit for generating a signal based on signals input from the plurality of sensors to make the display device display the condition of the secondary battery and to activate the switch; and
   a refreshing demand display device for displaying a need to initiate a refreshing change and discharge,
   wherein the operational control circuit, which is provided with a non-detecting timer is for preventing the sensors from detecting a rapid rise of voltage of the secondary battery during a predetermined time period from beginning of the charge,
   wherein the operational control circuit counts a number of times that the voltage of the secondary battery does not exceed a preset voltage within the predetermined time period, and
   wherein the refreshing demand display device displays a need to initiate a refreshing charge and discharge when the counted number reaches a predetermined number.

2. A battery package comprising:
   a group of batteries having a plurality of connected batteries forming a secondary battery;
   a plurality of sensors for detecting a temperature and a voltage;
   a display device for displaying a condition of the secondary battery;
   a switch for controlling charge and discharge of the secondary battery;
   an operational control circuit for generating a signal based on signals input from the plurality of sensors to make the display device display the condition of the secondary battery and to activate the switch; and
   a refreshing demand display device for displaying a need to initiate a refreshing charge and discharge,
   wherein the operational control circuit, which is provided with a non-detecting timer, is for preventing the sensors from detecting a rapid rise of voltage of the secondary battery during a predetermined time period from beginning of the charge, wherein the operational control circuit counts a number of times that the voltage of the secondary battery does not exceed a present voltage within the predetermined time period, and wherein the refreshing demand display device displays a need to initiate a refreshing charge and discharge in any of events that the counted number reaches a predetermined number, and a recovery voltage of the batteries does not exceed a predetermined voltage after another predetermined times has elapsed from a moment when the secondary battery comes to a final discharge voltage.

3. A method of charging and discharging a battery in a battery package, the battery package comprising:
   a group of batteries having a plurality of connected batteries forming a secondary battery;
   a plurality of sensors for detecting a temperature and a voltage;
   a display device for displaying a condition of the secondary battery;
   a switch for controlling charge and discharge of the secondary battery; and
   an operational control circuit for generating a signal based on signals input from the plurality of sensors to make the display device display the condition of the secondary battery and to activate the switch,
   wherein the method comprises the steps of:
   preventing the sensors from detecting a rapid rise in voltage of the secondary battery with a non-detecting timer provided in the operational control circuit;
   counting a number of times in which the voltage of the secondary battery does not exceed a preset voltage within a predetermined time period with the operational control circuit; and
   carrying out a refreshing charge and discharge when the counted number reaches a predetermined number.

4. A method of charging and discharging a battery in a battery package, the battery package comprising:
   a group of batteries having a plurality of connected batteries forming a secondary battery;
   a plurality of sensors for detecting a temperature and a voltage;
   a display device for displaying a condition of the secondary battery;
   a switch for controlling charge and discharge of the secondary battery; and
   an operational control circuit for generating a signal based on signals input from the plurality of sensors to make the display device display the condition of the secondary battery and to activate the switch,
   wherein the method comprises the steps of:
   preventing the sensors from detecting a rapid rise in voltage of the secondary battery with a non-detecting timer provided in the operational control circuit;
   counting a number at times in which the voltage of the secondary battery does not exceed a preset voltage within a predetermined time period with the operational control circuit; and
   carrying out a refreshing charge and discharge in any of events that the counted number reaches a predetermined number, and a recovery voltage of the secondary battery does not exceed a predetermined voltage after another predetermined time has elapsed from a moment when the second battery comes to a final discharge voltage.

5. A battery package comprising:
   a group of batteries having a plurality of connected batteries forming a secondary battery;
   a plurality of sensors for detecting a temperature and a voltage;
   a display device for displaying a condition of the secondary battery;
   a switch for controlling charge and discharge of the secondary battery;
   an operational control circuit for generating a signal based on signals input from the plurality of sensors to make the display device display the condition of the secondary battery and to activate the switch; and
   a refreshing demand display device for displaying a need to initiate a refreshing charge and discharge,
   wherein the refreshing demand display device displays a need to initiate a refreshing charge and discharge if a recovery voltage of the secondary battery does not exceed a predetermined voltage after a lapse of a predetermined time from a moment when the secondary battery comes to a final discharge voltage.

6. A method of charging and discharging a battery in a battery package, the battery package comprising:
   a group of batteries having plurality of connected batteries forming a secondary battery;
   a plurality of sensors for detecting a temperature and a voltage;
   a display device for displaying a condition of the secondary battery;
   a switch for controlling charge and discharge of the secondary battery; and
   an operational control circuit for generating a signal based on signals input from the plurality of sensors to make the display device display the condition of the secondary battery and to activate the switch,
   wherein the method comprises carrying out a refreshing charge and discharge if a recovery voltage of the secondary battery does not exceed a predetermined voltage after a predetermined time has elapsed from a moment when the secondary battery comes to a final discharge voltage.

7. The battery package claim 2 or 5, wherein the refreshing demand display device displays a need to initiate the refreshing charge and discharge if the recovery voltage of the secondary battery does not exceed 1.15 volt after at least one day has elapsed from the moment when the batteries come to the final discharge voltage.

8. The battery package according to claim 1, 2, or 5, wherein each of the batteries comprises an alkaline storage battery provided with a positive electrode mainly composed of a nickel odds, a negative electrode, a separator, and an alkaline electrolyte.

9. The battery package according to claim 8, wherein the negative electrode comprises a hydrogen storage alloy.

10. The battery package according to claim 1, 2, or 5, wherein the temperature sensor for detecting temperature detects a temperature of the secondary battery, and the operational control circuit computes a rate of temperature change according to the detected temperature, and generates and delivers a signal for terminating the charge to the switch for controlling the charge and discharge of the secondary battery, when the rate of temperature change exceeds a preset range.

11. The method of charging and discharging a battery according to claim 4 or 6 comprising carrying out the refreshing charge and discharge if the recovery voltage of the secondary battery does not exceed 1.15 volt after at least one day has elapsed from a moment when the secondary battery comes to the final discharge voltage.

12. The method of charging and discharging a battery according to claim 3, 4, or 6 further comprising charging the battery up to 90 to 120% of an initial capacity with a current of 5.0·It or less, and further charging up to 150 to 200% with a currant of 2.0·It or less for a given duration controlled by the timer function provided in the operational control circuit during the refreshing charge and discharge, where "If" denotes a rated battery capacity.

13. The method of charging and discharging a battery according to claim 3, 4, or 6 further comprising detecting a temperature of the secondary battery with the sensor, computing a rate of temperature change according to the detected temperature with the operational control circuit, and delivering a signal for termination of the charge to the switch for controlling the charge and discharge of the secondary battery when the rate of temperature change exceeds a preset range.

14. The method of charging and discharging a battery according to claim 13, wherein the rate of temperature change is preset to a range of 0.5 and 4.0° C./min.

15. The method of charging end discharging a battery according to claim 13, wherein the rate of temperature change is preset to a range of 1.0 and 3.0° C./min.

16. The method of charging and discharging a battery according to claim 3, 4, or 6, comprising carrying out charge and discharge by any of a constant-current charging and discharging method, a constant-voltage charging and discharging method, and a combination of the constant-current charging and discharging method and the constant-voltage charging and discharging method.

* * * * *